W. L. MILES.
GANG SAW MILL CARRIAGE AND STEAM FEED PRESSURE ROLL STRUCTURE.
APPLICATION FILED FEB. 10, 1908.

914,154.

Patented Mar. 2, 1909.
3 SHEETS—SHEET 1.

WITNESSES:
J. Ray Abbey
Ralph S. Warfield

INVENTOR
William L. Miles
BY
Geo. B. Willson
ATTORNEY

W. L. MILES.
GANG SAW MILL CARRIAGE AND STEAM FEED PRESSURE ROLL STRUCTURE.
APPLICATION FILED FEB. 10, 1908.

914,154.

Patented Mar. 2, 1909.
3 SHEETS—SHEET 2.

WITNESSES:
J. Ray Abby
Ralph S. Warfield

INVENTOR
William L. Miles
BY
Geo. B. Willcox
ATTORNEY

W. L. MILES.
GANG SAW MILL CARRIAGE AND STEAM FEED PRESSURE ROLL STRUCTURE.
APPLICATION FILED FEB. 10, 1908.

914,154.

Patented Mar. 2, 1909.
3 SHEETS—SHEET 3.

WITNESSES:
J. Ray Abbey
Ralph S. Warfield

INVENTOR
William L. Miles
BY
Geo. B. Willey
ATTORNEY

UNITED STATES PATENT OFFICE.

WILLIAM L. MILES, OF SAGINAW, MICHIGAN, ASSIGNOR TO WICKES BROTHERS, OF SAGINAW, MICHIGAN.

GANG-SAW-MILL CARRIAGE AND STEAM-FEED PRESSURE-ROLL STRUCTURE.

No. 914,154.  Specification of Letters Patent.  Patented March 2, 1909.

Application filed February 10, 1908. Serial No. 415,265.

*To all whom it may concern:*

Be it known that I, WILLIAM L. MILES, a citizen of the United States, residing at Saginaw, in the county of Saginaw and State of Michigan, have invented certain new and useful Improvements in Gang-Saw-Mill Carriages and Steam-Feed Pressure-Roll Structures; and I do hereby declare the following to be a full, clear, and exact description of the invention, such as will enable others skilled in the art to which it appertains to make and use the same.

My invention relates to gang saw mills.

One object is to provide means for permitting free access to the saws to repair or replace them.

Another object is to provide improved means for quickly and easily moving the carriage toward and from the saws.

A further object is to provide means for holding the carriage up to the saws and for retaining it in position away from the saws.

To these and other ends, my invention consists in certain novel features and combinations of parts such as will be more fully described hereinafter and particularly pointed out in the claims.

Figure 1:
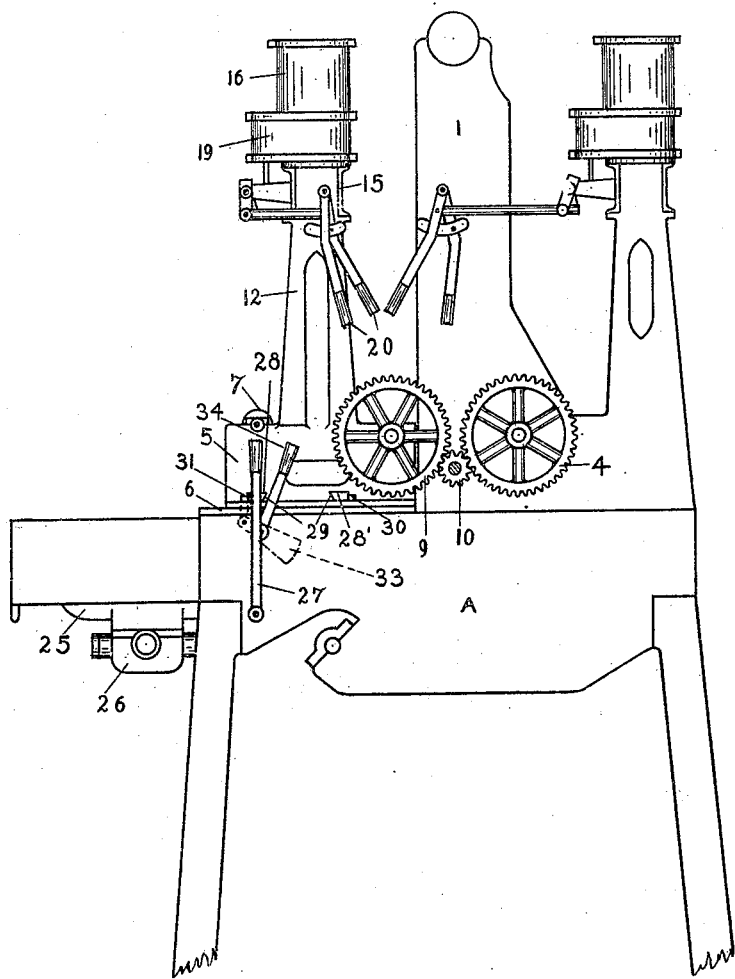
Figure 2:
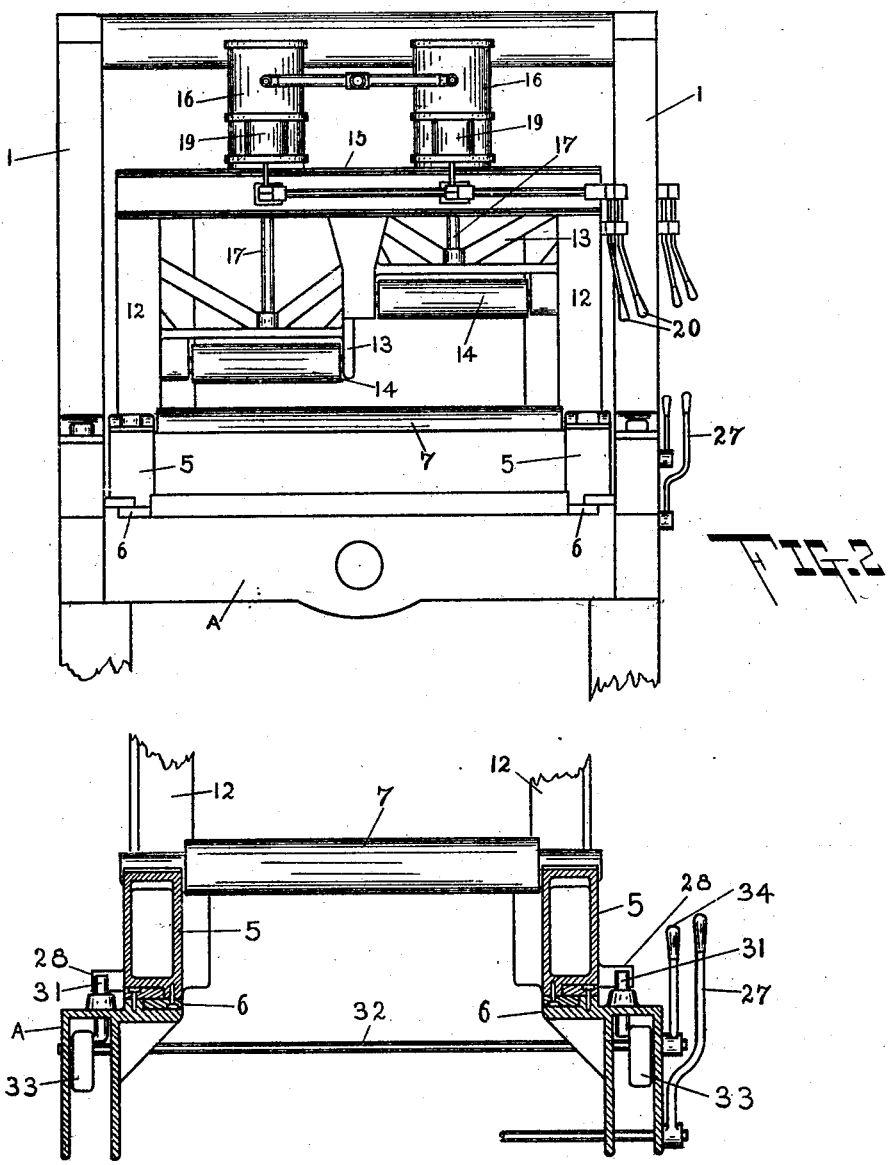
Figure 3:
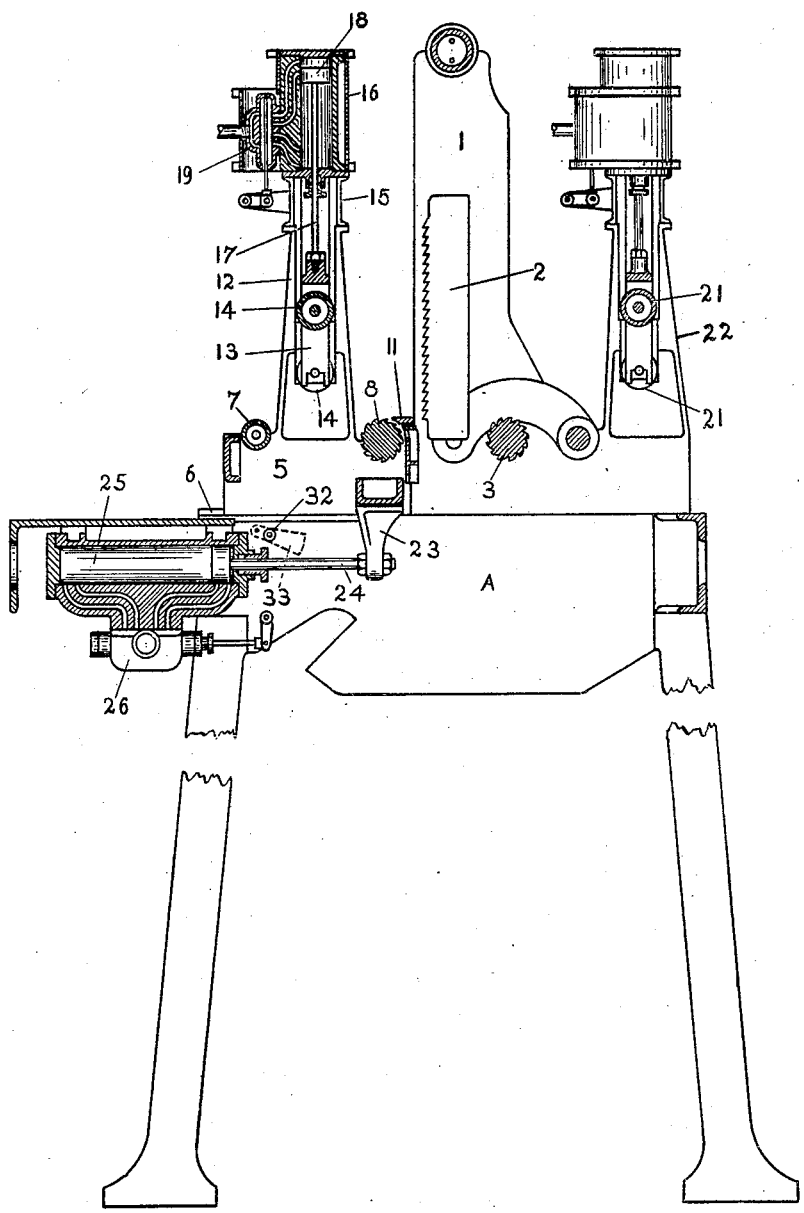

In the accompanying drawings, Figure 1 is an end view of a gang saw mill equipped with my invention; Fig. 2 is a front elevation; Fig. 3 is a vertical cross-section; and Fig. 4 is a detail view showing the stops.

(A) indicates any suitably-supported bed on which is stationarily mounted the saw frame (1) in which the saws (2) are vertically reciprocated by any suitable means, not shown. Behind the saws is located a feed roll (3), the shaft of which carries a gear (4). In front of the saws is located a carriage (5) sliding horizontally on ways (6) (6) toward and from the saws. An idle supporting roll (7) and a feed roll (8) are journaled in the carriage, the shaft of the feed roll carrying a gear (9). A driving pinion (10) meshes with the feed roll gears (4) and (9) when the carriage is adjacent the saws to feed the timber to the saws. The carriage also supports a jaw (11) on which the inner end of the timber is supported.

Heretofore the press rolls have generally been associated with the saw frame and form more or less of an obstruction when it is desired to inspect or repair the saws. Furthermore, the vibration of the saw frame is detrimental to the proper operation of the rolls in that it shakes the cylinders and piston rods and strains the parts.

One object of this invention is to permit free access to the saws and avoid the strain incident to mounting the press roll mechanism on the saw frame. As one means for attaining these ends, I preferably mount the forward press rolls on the sliding carriage.

Standards (12) (12) are supported on the carriage, the standards being provided with ways in which are received the press roll frames (13) (13) carrying the press rolls (14) (14). A cross-piece (15) connects the upper ends of the standards and supports the steam cylinders (16) (16). Piston rods (17) secured to the press roll frames are connected to piston heads (18) within the cylinders (16) (16).

Valves (19) control the admission of steam to the cylinders (16) to raise or lower the press rolls. The valves may be manually controlled by means of the hand-operated levers (20), connected to the valves in any convenient manner.

The rear press rolls (21) are slidably mounted in standards (22) stationarily supported on the bed (A) in rear of the rear feed roll (3). The construction and operation of the press rolls (21) is similar to that of the forward press rolls, except that the rear press rolls are not herein shown as movable toward and from the saws. Hence a description of the rear press rolls is unnecessary.

From the foregoing, it is obvious that when the carriage is moved away from the saw frame, the operator is afforded free access to the saws.

In former constructions the carriage has been moved back and forth by a rack and pinion mechanism or equivalent manually-operated construction. The shifting of the carriage was, therefore, a slow and laborious process. My carriage, however, is considerably heavier than former carriages by reason of the added weight of the press rolls and their connections. Therefore, it is advisable to provide means for shifting the carriage by the application of steam or equivalent power, to which end I may provide the carriage with a bracket (23) to which is secured a piston (24) received in a steam cylinder (25) preferably supported beneath the bed (A). A valve (26) controls the admission of steam to the cylinder to move the carriage toward or from the saws. The valve is controlled by means of a lever (27) connected in any convenient manner to the valve. The steam cylinder and carriage are thus directly connected.

Among other causes, the continual jar and vibration of the mill is liable to accidentally shift the position of the carriage or the operation of the mill. Furthermore, the operator may be careless in shifting the carriage so that it is desirable to provide means for limiting the travel of the carriage. To this end I provide the carriage with projecting abutments (28) (28'), the adjacent ends of which are beveled, as at (29) (29), the abutments being spaced apart from each other. I also provide a rigid stop (30) projecting from the bed (A) at a point adjacent to the saw frame. The rigid stop (30) operates to limit the movement of the carriage toward the saws and is so placed that when the abutment (28') engages the stop, the gang parts are in proper alinement to commence work.

As one means for retaining the carriage adjacent the stop, I provide one or more sliding pins (31) projecting into the path of movement of the abutments. A shaft (32) journaled in the bed carries a pair of counterweighted cranks (33) (33), the pins (31) being pivotally secured to the lighter ends of the cranks and passing through holes in the bed. The shaft is actuated by means of a lever (34).

Ordinarily the weighted ends of the cranks project the pins into the path of movement of the abutments (28 )(28'), the pins, when the carriage is in operating position, lying just in front of and adjacent to the forward abutments (28) to hold the carriage against accidental movement.

When it is desired to shift the carriage away from the saws, the lever (34) is operated to withdraw the pins (31) from in front of the abutments (28), after which lever (27) is operated to admit steam to cylinder (25), thereby moving the carriage away from the saws. The limit of travel of the piston (24) is reached before the carriage runs off the ways. As the beveled end of the abutment (28') reaches the pin (31) it presses the latter down, but when the abutment has passed, the end of the pin is again projected and prevents the accidental movement of the carriage toward the saws, even though the steam lever (25) is accidentally thrown over.

Many changes might be made in the form and arrangement of the several parts described without departing from the spirit and scope of my invention, and hence I do not wish to limit myself to the exact construction herein set forth.

Having thus fully disclosed my invention, what I claim as new is—

1. In a gang saw mill, the combination with a bed, a frame, and saws reciprocating therein, of a carriage slidably mounted on the frame and movable toward and from the saws, a feed roll and a power actuated press roll mounted on the carriage, a power cylinder, means directly connecting the power cylinder and carriage to move the carriage toward and from the saws and a lever controlling the admission of power to the cylinder.

2. In a gang saw mill, the combination with a carriage, of power actuated press rolls mounted on the carriage, a power cylinder for actuating the carriage, abutments projecting from the carriage, a rigid stop engaged by one of the abutments to limit the inward movement of the carriage, a movable pin normally projecting into the path of movement of the remaining abutment and adapted to take behind such abutment when the carriage is at the limit of its inward movement and means controlled by the operator for withdrawing the pin.

3. In a gang saw mill, the combination with a carriage, of a stop for limiting the inward movement of the carriage, a movable pin spaced apart from the stop and adapted to prevent movement of the carriage away from the stop and a lever for withdrawing the pin.

4. In a gang saw mill, the combination with a movable carriage, of a pair of abutments projecting from the carriage, a stop engaged by one of the abutments to limit the inward movement of the carriage, a rotatable shaft, counterweighted arms carried by the shaft, pins connected to the lighter ends of the arms and normally projected into the paths of movement of the remaining abutments to take behind such abutments when the carriage is at its inward limit of movement, and a lever for actuating the shaft.

In testimony whereof, I affix my signature in presence of two witnesses.

WILLIAM L. MILES.

Witnesses:
N. M. ANGUS,
RALPH S. WARFIELD.